US012620292B2

(12) United States Patent
Baerlocher et al.

(10) Patent No.: US 12,620,292 B2
(45) Date of Patent: *May 5, 2026

(54) DETERMINING AWARDS FOR PLAYS OF DIFFERENT GAMES USING MECHANICAL REELS

(71) Applicant: IGT, Las Vegas, NV (US)

(72) Inventors: Anthony Baerlocher, Henderson, NV (US); Cullen O'Day, Reno, NV (US); Jason R. Mead, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/589,048

(22) Filed: Feb. 27, 2024

(65) Prior Publication Data

US 2024/0249594 A1 Jul. 25, 2024

Related U.S. Application Data

(63) Continuation of application No. 17/487,853, filed on Sep. 28, 2021, now Pat. No. 11,941,946.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3267; G07F 17/3213; G07F 17/34
See application file for complete search history.

(56) References Cited

U.S. PATENT DOCUMENTS

| | | | |
|---|---|---|---|
| 4,448,419 | A | 5/1984 | Telnaes |
| 5,152,529 | A | 10/1992 | Okada |
| 6,358,146 | B1 | 3/2002 | Adams |
| 6,893,018 | B2 | 5/2005 | Inoue |
| 7,458,890 | B2 | 12/2008 | Loose et al. |
| 7,559,838 | B2 | 7/2009 | Walker et al. |
| 7,686,685 | B2 | 3/2010 | Englman et al. |
| 7,722,462 | B2 | 5/2010 | Mayeroff |
| 7,753,773 | B2 | 7/2010 | Baerlocher et al. |
| 7,806,760 | B2 | 10/2010 | Baerlocher |
| 7,896,734 | B2 | 3/2011 | Kaminkow et al. |
| 8,192,281 | B2 | 6/2012 | Williams et al. |
| 8,216,051 | B2 | 7/2012 | Rasmussen |
| 8,235,804 | B2 | 8/2012 | Gagner et al. |
| 8,342,941 | B2 | 1/2013 | Nicely |
| 8,403,743 | B2 | 3/2013 | Pacey et al. |
| 8,628,407 | B2 | 1/2014 | Arezina et al. |
| 8,684,808 | B2 | 4/2014 | Aoki et al. |
| 8,814,654 | B2 | 8/2014 | Hoffman et al. |
| 9,058,714 | B2 | 6/2015 | Hamlin et al. |
| 10,204,491 | B2 | 2/2019 | Idris et al. |
| 10,380,832 | B2 | 8/2019 | Marston et al. |
| 2003/0195034 | A1 | 10/2003 | Dunaevsky |
| 2004/0048645 | A1 | 3/2004 | Webb et al. |

(Continued)

*Primary Examiner* — Jeffrey K Wong
(74) *Attorney, Agent, or Firm* — Neal, Gerber & Eisenberg LLP

(57) ABSTRACT

Gaming systems and methods that employ a plurality of mechanical reels for a plurality of plays of a plurality of different games, wherein the different games are associated with different attributes conveyed via a video transmissive display device.

20 Claims, 9 Drawing Sheets

(56) References Cited

U.S. PATENT DOCUMENTS

| | | | | |
|---|---|---|---|---|
| 2004/0053665 | A1 | 3/2004 | Baerlocher | |
| 2004/0224745 | A1* | 11/2004 | Bregenzer | G07F 17/32 463/16 |
| 2004/0242312 | A1 | 12/2004 | Gomez et al. | |
| 2005/0070353 | A1 | 3/2005 | Webb et al. | |
| 2005/0075159 | A1 | 4/2005 | Kaminkow et al. | |
| 2005/0096121 | A1 | 5/2005 | Gilliland et al. | |
| 2005/0137019 | A1* | 6/2005 | Ikeda | G07F 17/3211 312/223.1 |
| 2006/0025201 | A1 | 2/2006 | Van | |
| 2007/0072668 | A1 | 3/2007 | Hein et al. | |
| 2008/0004101 | A1 | 1/2008 | Hein et al. | |
| 2008/0032781 | A1 | 2/2008 | Seelig et al. | |
| 2008/0096648 | A1 | 4/2008 | Webb et al. | |
| 2008/0167109 | A1* | 7/2008 | Seelig | G07F 17/34 463/16 |
| 2008/0227530 | A1 | 9/2008 | Lemay et al. | |
| 2009/0104964 | A1 | 4/2009 | Snow | |
| 2009/0131148 | A1 | 5/2009 | Loose et al. | |
| 2009/0203420 | A1 | 8/2009 | Yoshizawa | |
| 2010/0041461 | A1 | 2/2010 | Demsetz et al. | |
| 2010/0105454 | A1* | 4/2010 | Weber | H04L 67/53 463/1 |
| 2011/0117987 | A1* | 5/2011 | Aoki | G07F 17/32 463/20 |
| 2013/0157751 | A1* | 6/2013 | Loose | G07F 17/3211 463/25 |
| 2014/0094274 | A1* | 4/2014 | Guinn | G07F 17/3244 463/25 |
| 2014/0094280 | A1 | 4/2014 | Berman | |
| 2015/0339876 | A1 | 11/2015 | Koza et al. | |
| 2016/0092069 | A1 | 3/2016 | Kelly et al. | |
| 2016/0093139 | A1 | 3/2016 | Zielinski et al. | |
| 2020/0005591 | A1 | 1/2020 | Halvorson | |

* cited by examiner

DETERMINING AWARDS FOR PLAYS OF DIFFERENT GAMES USING MECHANICAL REELS

PRIORITY CLAIM

This application is a continuation of, claims the benefit of and priority to U.S. patent application Ser. No. 17/487,853, filed on Sep. 28, 2021, the entire contents of which is incorporated by reference herein.

BACKGROUND

In various embodiments, the systems and methods of the present disclosure employ a plurality of mechanical reels for a plurality of plays of a plurality of different games, wherein the different games are associated with different attributes conveyed via a video transmissive display device.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In certain embodiments, the present disclosure relates to an electronic gaming machine including a plurality of mechanical reels, each mechanical reel comprising a plurality of symbols displayed at a plurality of reel display positions. The electronic gaming machine also includes a video transmissive display device comprising a controllable transparent portion arranged relative to the mechanical reels such that a common line of sight passes through a portion of the video transmissive display device to a portion of each of the mechanical reels. The electronic gaming machine further includes a processor, and a memory device that stores a plurality of instructions. When executed by the processor responsive to a play of a first game associated with a first quantity of activated paylines displayed by the video transmissive display device, the instructions cause the processor to select, based on the first quantity of activated paylines, a first paytable, for each of the mechanical reels, randomly determine, based on the selected first paytable, a symbol of the symbols of that mechanical reel, and for each of the mechanical reels, cause that mechanical reel to move such that the reel display position associated with the randomly determined symbol of the symbols of that mechanical reel is viewable through the controllable transparent portion of the video transmissive display device. When executed by the processor responsive to a play of a second game associated with a second, different quantity of activated paylines displayed by the video transmissive display device, the instructions cause the processor to select, based on the second, different quantity of activated paylines, a second, different paytable, for each of the mechanical reels, randomly determine, based on the selected second, different paytable, a symbol of the symbols of that mechanical reel, and for each of the mechanical reels, cause that mechanical reel to move such that the reel display position associated with the randomly determined symbol of the symbols of that mechanical reel is viewable through the controllable transparent portion of the video transmissive display device.

In certain embodiments, the present disclosure relates to an electronic gaming machine including a plurality of mechanical reels, each mechanical reel comprising a plurality of symbols displayed at a plurality of reel display positions. The electronic gaming machine also includes a video transmissive display device comprising a controllable transparent portion arranged relative to the mechanical reels such that a common line of sight passes through a portion of the video transmissive display device to a portion of the mechanical reels. The electronic gaming machine further includes a processor, and a memory device that stores a plurality of instructions. When executed by the processor, the instructions cause the processor to receive an input, via an input device, of a quantity of paylines for a play of a game, and for each of the quantity of paylines for the play of the game: activate that payline, and cause the video transmissive display device to display that payline, wherein the controllable transparent portion of the video transmissive display device displays at least part of each activated payline. When executed by the processor, the instructions cause the processor to determine, based on the activated paylines, a paytable for the play of the game, wherein different paytables are associated with different activated paylines, and for each of the mechanical reels, randomly determine, based on the determined paytable for the play of the game, a symbol of the symbols of that mechanical reel. When executed by the processor for each of the mechanical reels, the instructions cause the processor to cause that mechanical reel to move such that the reel display position associated with the randomly determined symbol of the symbols of that mechanical reel is viewable through the controllable transparent portion of the video transmissive display device. When executed by the processor, the instructions cause the processor to determine, based on the activated paylines and the symbols of the mechanical reels viewable through the controllable transparent portion of the video transmissive display device, an award for the play of the game.

In certain embodiments, the present disclosure relates to an electronic gaming machine including a plurality of mechanical reels, each mechanical reel comprising a plurality of symbols displayed at a plurality of reel display positions. The electronic gaming machine also includes a video transmissive display device comprising a controllable transparent portion arranged relative to the mechanical reels such that a common line of sight passes through a portion of the video transmissive display device to a portion of the mechanical reels. The electronic gaming machine further includes a processor, and a memory device that stores a plurality of instructions. When executed by the processor responsive to a play of a first game associated with a first quantity of wagered on paylines displayed by the video transmissive display device, the instructions cause the processor to select, based on the first quantity of wagered on paylines, a first paytable, for each of a first quantity of the mechanical reels associated with the play of the first game, randomly determine, based on the selected first paytable, a symbol of the symbols of that mechanical reel, and for each of the first quantity of mechanical reels, cause that mechanical reel to move such that the reel display position associated with the randomly determined symbol of the symbols of that mechanical reel is viewable through the controllable transparent portion of the video transmissive display device. When executed by the processor responsive to a play of a second game associated with a second, different quantity of wagered on paylines displayed by the video transmissive display device, the instructions cause the processor to select, based on the second, different quantity of activated paylines, a second, different paytable, for each of a second, different quantity of the mechanical reels associated with the play of the second game, randomly determine, based on the selected second, different paytable, a symbol of the symbols of that mechanical reel, and for each of the second, different quantity of the mechanical reels, cause that mechanical reel to move such that the reel display position associated with the randomly determined symbol of the symbols of that mechanical reel is viewable through the controllable transparent portion of the video transmissive display device.

Additional features are described herein, and will be apparent from the following Detailed Description and the figures.

DETAILED DESCRIPTION

Figure 1:
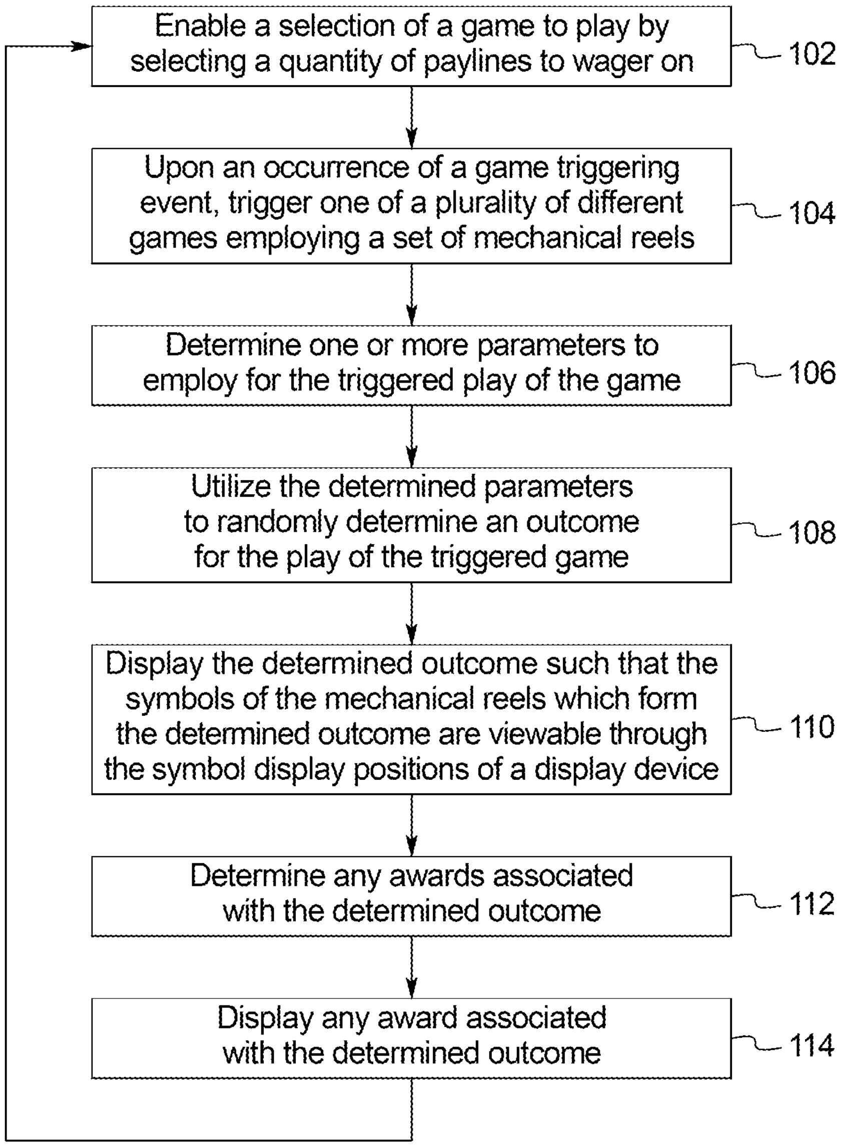
FIG. 1 is a flow chart of an example process of one embodiment of operating a gaming system including providing different games associated with the same plurality of mechanical reels.

In various embodiments, the present disclosure relates generally to gaming systems and methods that employ a plurality of mechanical reels for a plurality of plays of a plurality of different games, wherein the different games are associated with different attributes conveyed via a video transmissive display device.

In certain embodiments, the gaming systems and methods of the present disclosure utilize the same set of mechanical reels of an electronic gaming machine ("EGM") to offer a plurality of different games at different points in time. In these embodiments, in association with an occurrence of a game triggering event, the gaming system selects one of a plurality of different games to play, such as by selecting one of a plurality of different paytables to employ for one or more activations of the set of mechanical reels. The use of different paytables associated with the same mechanical reels having the same symbols enables multiple different games to be offered despite the hardware limitations of the static reel strips associated with the mechanical reels. That is, by utilizing different paytables and a dynamic display device positioned in alignment with the mechanical reels (to introduce additional game play elements independent of the mechanical reels), the same EGM may be reconfigured from offering a single game to offering a plurality of different games.

In certain embodiments, different games to play in association with the set of mechanical reels are associated with different payline configurations displayed utilizing a display device, such as a video transmissive display device, positioned over the set of mechanical reels. In these embodiments, the display device enables different quantities of paylines to be activated and/or different combinations of the same quantity of paylines to be activated for different activations of the mechanical reels. Such different quantities of paylines to be activated and/or different combinations of the same quantity of paylines to be activated results in the selection of different paytables and thus the selection of different games to be played employing the same set of mechanical reels. In these embodiments, following the selection of a paytable based on the payline configuration selected, the gaming system employs the selected paytable to randomly determine a plurality of symbols displayed via the mechanical reels. For example, the gaming system activates a set of mechanical reels, such as spins and stops a set of mechanical reels, to indicate, at symbol display positions along the activated paylines displayed via the display device, a plurality of symbols (which may or may not be associated with any awards in accordance with the selected paytable).

Accordingly, the utilization of different paytables associated with the same set of mechanical reels provides that the gaming system of the present disclosure is operable to provide a plurality of plays of different games employing the same set of mechanical reels. Put differently, while the award amounts and/or symbols displayed by the reel strips of the mechanical reels will remain static from game to game, modifying the probabilities, from game to game, that certain symbols will be indicated by certain activated paylines associated with the set of mechanical reels results in the same set of mechanical reels being employable or otherwise associated with a plurality of different games. In other words, dynamically altering, based on one or more variables such as a payline configuration displayed by a display device, the probabilities of one or more statically displayed symbols being randomly selected in association with a set of mechanical reels adds to the versatility of such a set of mechanical reels (i.e., the gaming system does not need to be retrofitted with a new set of mechanical reels when a new game is introduced) as well as provides the player a level of influence over which paytable will be employed (e.g., the player determining which paylines to activate is a factor in which paytable to employ).

While certain embodiments described below are directed to offering one or more plays of different primary games utilizing the same set of mechanical reels, it should be appreciated that such embodiments may additionally or alternatively be employed in association with one or more plays of different secondary games, such as bonus games, utilizing the same set of mechanical reels. Additionally, while certain embodiments described below are directed to one or more plays of different reel games utilizing the same set of mechanical reels, it should be appreciated that such embodiments may additionally or alternatively be employed in association with one or more plays of different non-reel games, such as card games, keno games and/or bingo games utilizing the same physical device. Furthermore, while the player's credit balance, the player's wager, and any awards are displayed as an amount of monetary credits or currency, in certain of the embodiments described below, one or more of such player's credit balance, such player's wager, and any awards provided to such a player may be for non-monetary credits, promotional credits, and/or player tracking points or credits.

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In different embodiments, prior to a play of a game employing a set of mechanical reels, the gaming system enables a selection of a game to play by selecting a quantity of paylines to wager on as indicated in block 102. In these embodiments, different games are associated with different quantities and configurations of paylines such that the selected quantity and configuration of paylines determines which of a plurality of different games to play upon an occurrence of a game triggering event. That is, unlike prior gaming systems that utilize a static configuration of paylines associated with a plurality of mechanical reels (such that a single game is offered by that gaming system), the gaming system of the present disclosure utilizes a dynamic configuration of paylines associated with a plurality of mechanical reels (such that different games are offered by the gaming system).

In certain embodiments, the game employing a set of mechanical reels is a primary game, such as a primary wagering game, wherein, as described above, the game triggering event includes the placement of a wager on the play of the primary game. In certain embodiments, the game employing a set of mechanical reels is a primary game, such as a primary wagering game, wherein the game triggering event includes the placement of a side wager in addition to the wager placed on the play of the primary game. In certain embodiments, the game employing a set of mechanical reels is a secondary game, wherein the game triggering event occurs based on a displayed event associated with a play of a primary game. In certain other embodiments, the game employing a set of mechanical reels is a secondary game, wherein the game triggering event occurs based on an event independent of any displayed event associated with the play of the primary game.

Figure 2A:
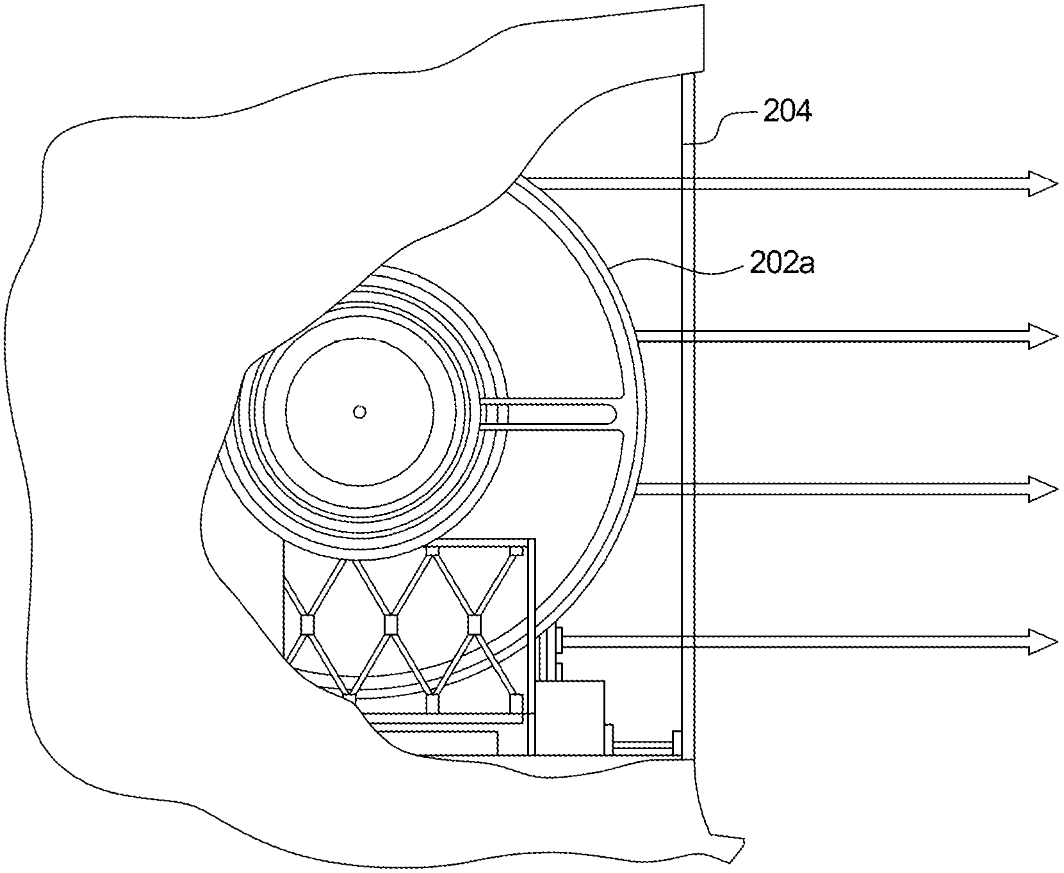
FIG. 2A is a side view of a video transmissive display device of one embodiment of a gaming system of the present disclosure aligned with a plurality of mechanical reels.
Figure 2B:
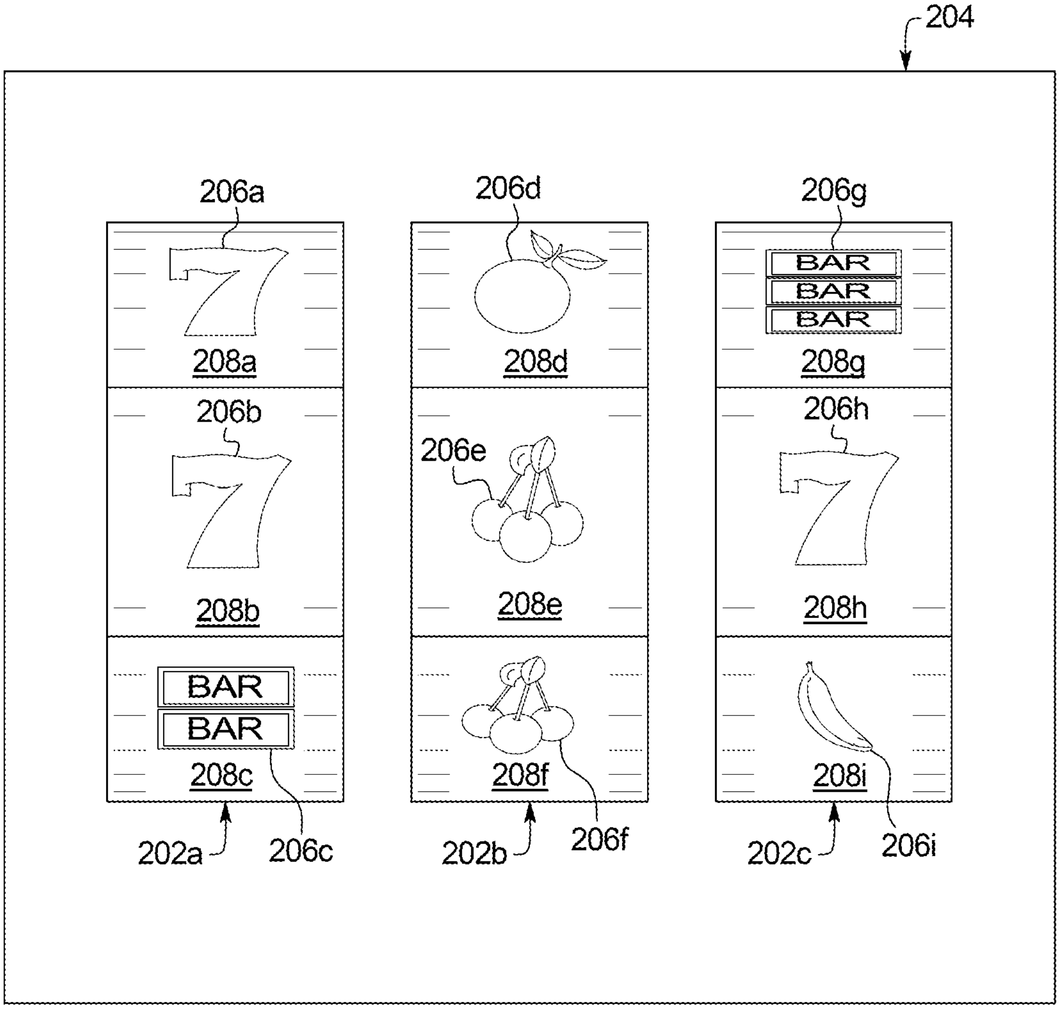
FIG. 2B is a front view of a video transmissive display device of one embodiment of a gaming system of the present disclosure aligned with a plurality of mechanical reels.

It should be appreciated that unlike prior gaming systems that included paylines printed on glass placed in front of the mechanical reels (relative to the player) which could not be altered or reconfigured, the gaming system of the present disclosure utilizes a display device, such as a transmissive display device (that is separate from but associated with the set of mechanical reels), to display the available and wagered on paylines. In these embodiments, the gaming system employs one or more display devices positioned directly in a player's line of sight as the player views the set of mechanical reels. For example, as seen in FIG. 2A, an EGM includes a plurality of mechanical reels 202*a* (only one shown in FIG. 2A) and a display device 204 mounted over the plurality of mechanical reels in the player's line of sight. In this example, a support structure, housing, or cabinet of the EGM houses or otherwise supports a display device, a plurality of mechanical reels and, in certain instances, a touchscreen. The display device and the plurality of mechanical reels are separated by a predetermined distance and mounted and oriented within the housing such that at least one straight line of sight intersects both of the faces or display surfaces of the display device and the mechanical reels. In this example, as seen in FIG. 2B, each mechanical reel 202*a* to 202*c* is associated with a plurality of symbols 206*a* to 206*i* displayed at a plurality of reel display positions along the reel strip of that mechanical reel (not shown), wherein the plurality of symbols are available for a play of the game employing that mechanical reel.

In certain embodiments, the display device (or a portion of the display device) is translucent or transparent, or alternatively has the capacity to be translucent or transparent under the control of the processor. In other words, the display device displays one or more images that may be selectively made transparent, semi-transparent and/or opaque. In these embodiments, the display device comprises a transparent video display device that is superimposed over the mechanical reels and operable to display selected video images superimposed over the mechanical reels wherein based on zero, one or more properties of the superimposed video image, part, all or none of the mechanical reels may be visible to the player. In operation, when the display device is transparent or translucent, a player can see any images displayed by the display device as well as the mechanical reels positioned behind the display device (i.e., by looking through the transparent display device). Accordingly, the display device and the mechanical reels operate to display co-acting or overlapping images to a player to enable a player to play different games and/or provide different game functions at different points in time.

More specifically, in certain embodiments, the display device displays one or more images wherein part or all of that image may be selectively made transparent to enable part or all of the mechanical reels to be viewable through the display device. For example, as seen in FIG. 2B, a portion of the display device 204 displays a plurality of transparent symbol display positions 208*a* to 208*i* through which a player may view the symbols 206*a* to 206*i* of the plurality of mechanical reels 202*a* to 202*c* currently aligned with the transparent symbol display positions.

Figure 3A:
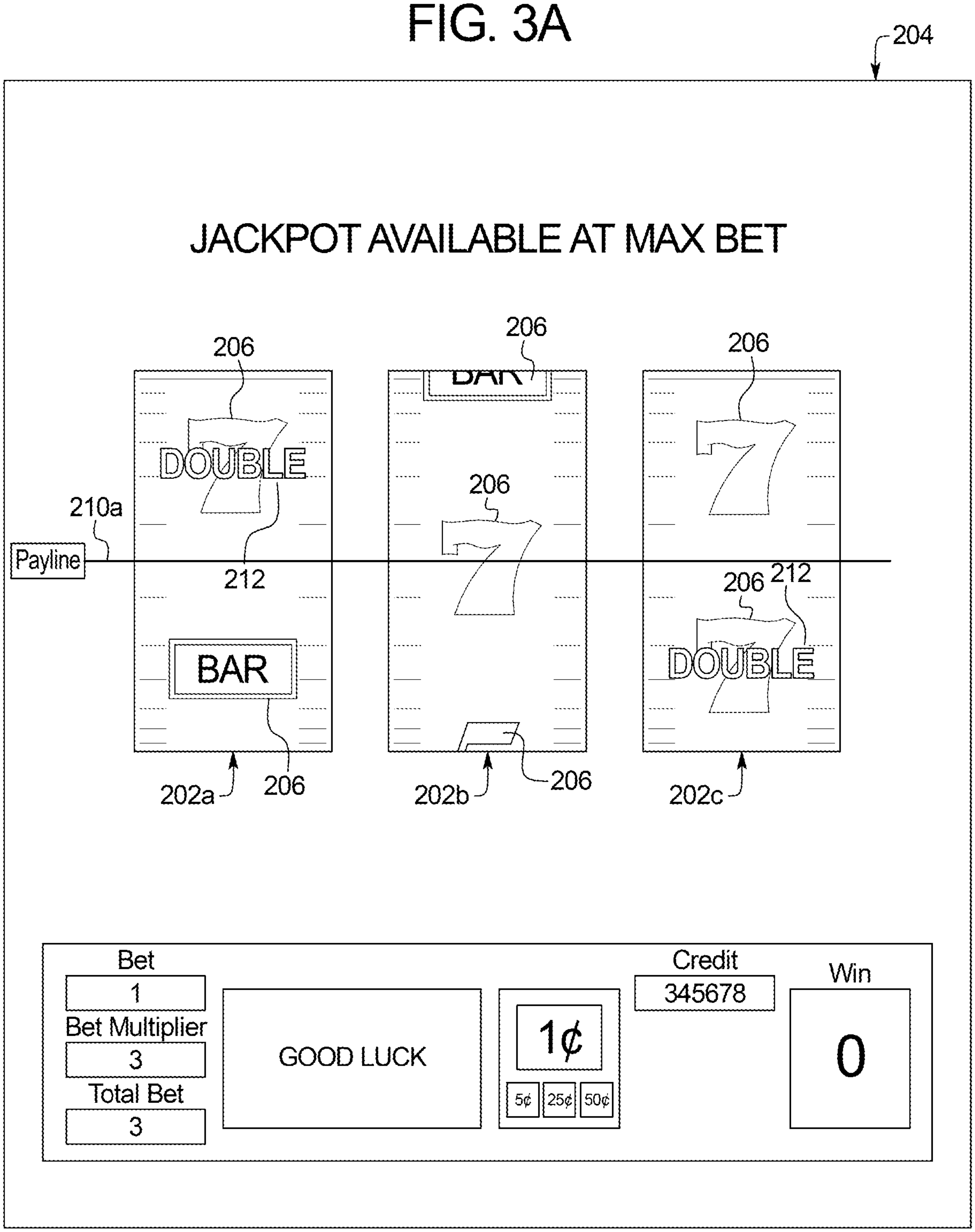
FIGS. 3A, 3B and 3C are front views of playing different games using the same plurality of mechanical reels and different quantities of paylines displayed by a video transmissive display device aligned with the plurality of mechanical reels.
Figure 3B:
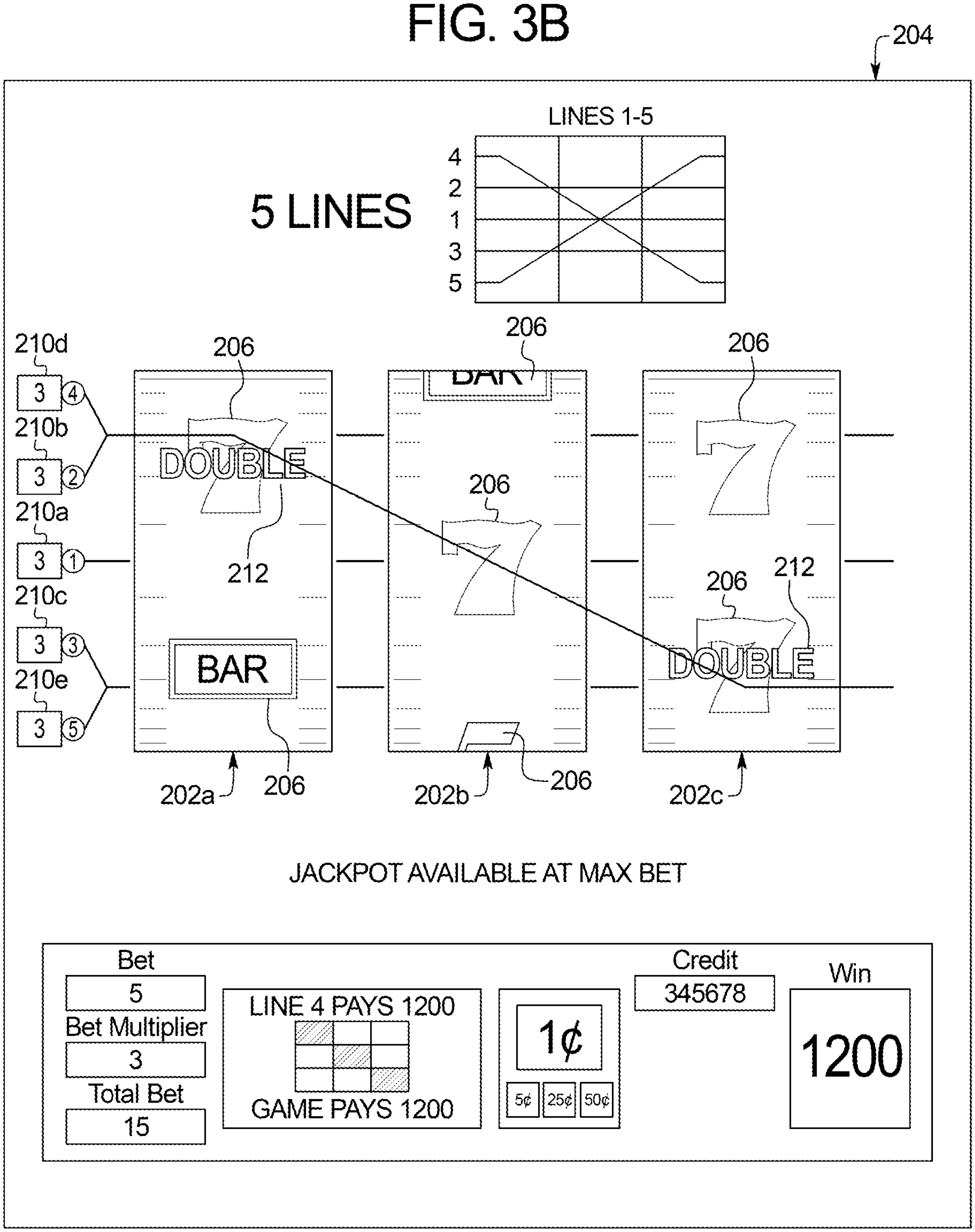
Figure 3C:
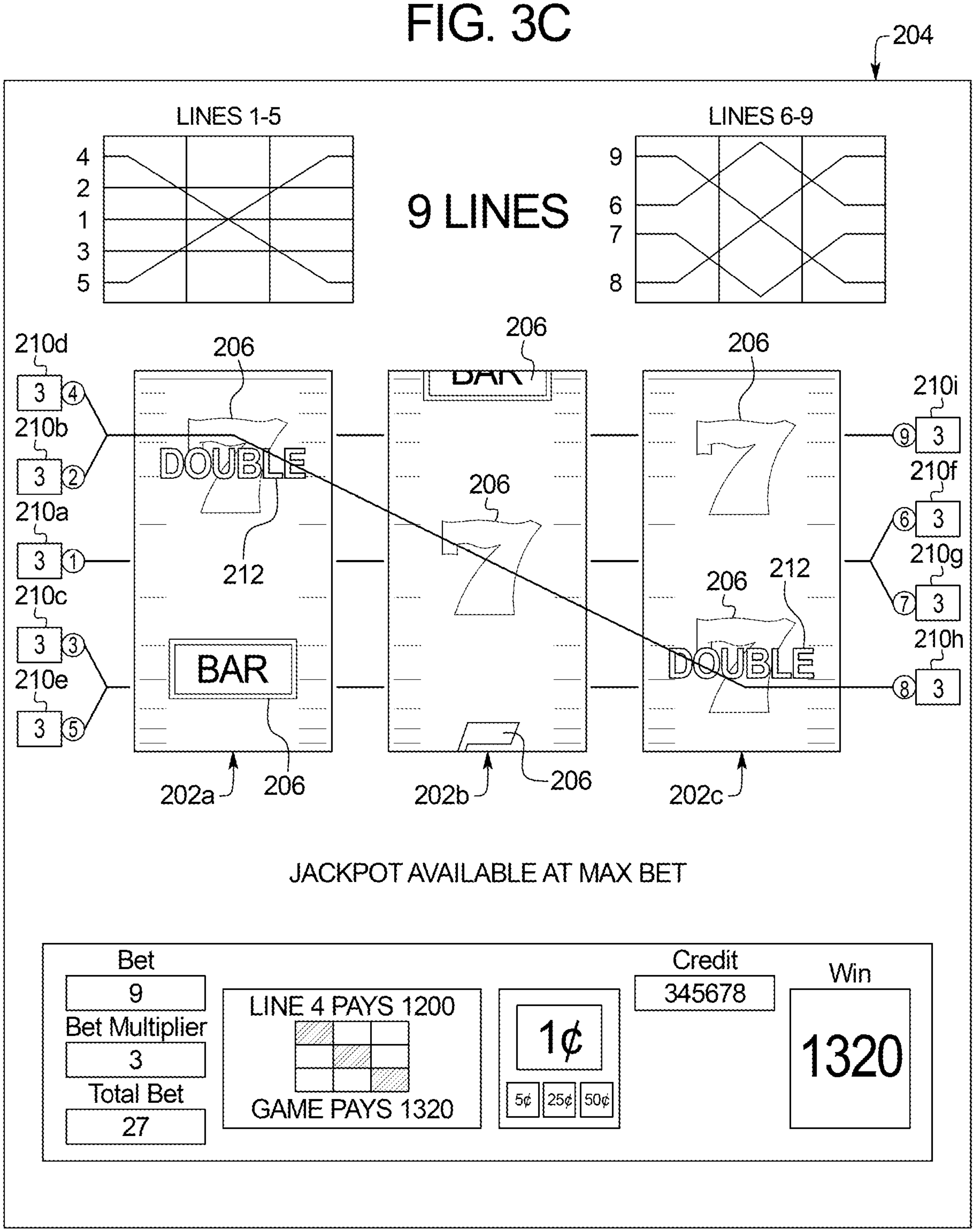

In certain embodiments, the display device displays one or more images wherein part or all of that image may be selectively made opaque to enable part or all of the mechanical reels to be blocked or otherwise not viewable through the display device. For example, as seen in FIGS. 3A to 3C, different portions of the display device 204 displays one or more paylines (a single payline 210*a* of FIG. 3A, five paylines 210*a* to 210*e* of FIG. 3B and nine paylines 210*a* to 210*i* of FIG. 3C) that intersects a plurality of the transparent symbol display positions 208*a* to 208*i* of the display device 204 through which a player may view the plurality of reel display positions of the plurality of mechanical reels 202*a* to 202*c*. As seen in these examples, the orientation of the display device in front of the mechanical reels (relative to the position of the player) results in the player being unable to view the portion of the mechanical reels blocked by the paylines displayed by the display device.

In certain embodiments, the display device displays one or more images wherein part or all of that image may be selectively made semi-transparent to enable part or all of the mechanical reels to be partially viewable through the display device. For example, as seen in FIG. 3A, the word "DOUBLE" 212 is displayed by the display device 204 superimposed over the displayed seven symbol of mechanical reel 202*a* such that part of the seven symbol of the underlying mechanical reel is visible but in an altered state (i.e., semi-transparent relative to other symbols that do not include this element added by the display device).

Following the selection of a game via the selection of a quantity of paylines to wager on, as indicated in block 104, upon an occurrence of a game triggering event, the gaming system triggers one of a plurality of different games employing the set of mechanical reels. In certain embodiments, the placement of a wager on the selected quantity of paylines qualifies as the occurrence of the game triggering event wherein which of the plurality of different games is triggered is based on the selected quantity of wagered on paylines. For example, a placement of a wager on one payline results in a first game associated with a plurality of mechanical reels 202*a* to 202*c* being triggered (as seen in FIG. 3A), a placement of a wager on five paylines results in a second, different game associated with the plurality of mechanical reels 202*a* to 202*c* being triggered (as seen in FIG. 3B), and a placement of a wager on nine paylines results in a third, different game associated with the plurality of mechanical reels 202*a* to 202*c* being triggered (as seen in FIG. 3C). As seen in this example, the same set of mechanical reels are associated with each of the games played but such different games played are associated with different quantities of paylines evaluated for any awards.

In various embodiments, for the triggered play of the game employing a set of mechanical reels, as indicated in block 106 of FIG. 1, the gaming system determines one or more parameters to employ for the triggered play of the game. In different embodiments, such parameters include, but are not limited to: a paytable to employ for the triggered play of the game, a quantity of activations of the mechanical reels, a modifier to apply to any award associated with the symbols displayed by the mechanical reels, and/or whether or not to employ an element of skill (i.e., enable the player to make a skill input to stop the activated mechanical reels) or pseudo-skill in association with the play of the triggered game employing a set of mechanical reels.

In certain embodiments, the parameter determined to employ for the triggered play of the game includes the gaming system determining a paytable to utilize for the play of the triggered game. In various embodiments, the gaming system stores a plurality of different paytables associated with the mechanical reels. In certain embodiments, for each different scenario of how the mechanical reels will be utilized, the gaming system stores a different paytable. In these embodiment, since the same set of symbols of the same set of mechanical reels are used for each of the games offered by the gaming system, the different paytables vary based on having differing probabilities of zero, one or more symbols being randomly generated and/or having different award amounts associated with different symbol combinations. That is, by altering the probability of the same symbol being generated in a play of a first game to a play of a second game and/or by altering the award associated with the same symbol combination from a play of a first game to a play of a second game, the gaming system of the present disclosure operates to make different games available to be played using the same set of symbols from the same set of mechanical reels for each of the different games available to be played.

In certain embodiments, to account for the different quantity of paylines activated for an activation of the mechanical reels (i.e., different scenarios of how the same mechanical reels will be utilized with different quantities of paylines evaluated), the gaming system stores different paytables wherein such paytables include the probabilities that each of the mechanical reels will land in a designated configuration or stopping position. For example, the gaming system: selects a first paytable if the game of FIG. 3A is selected to be played based on the activation of a single payline; selects a second, different paytable if the game of FIG. 3B is selected to be played based on the activation of a five paylines; and selects a third, different paytable if the game of FIG. 3C is selected to be played based on the activation of nine paylines. In certain other embodiments, to account for the different wager amounts placed per activated payline and the different quantity of paylines activated for an activation of the mechanical reels (i.e., different scenarios of how the same mechanical reels will be utilized), the gaming system stores different paytables wherein such paytables include the probabilities that each of the mechanical reels will land in a designated configuration or stopping position.

In certain embodiments, to account for the different parameters which may be employed in association with the different plays of the game that each utilize the same mechanical reels, the gaming system dynamically selects the appropriate paytable for the appropriate scenario such that regardless of the particular parameters employed, the play of the game employing a set of mechanical reels maintains a predictable and consistent average expected payout. It should be appreciated that since, in certain embodiments, certain of the parameters of the play of the game employing a set of mechanical reels are randomly determined (e.g., whether zero, one or more symbols will be modified using the video transmissive display device) and certain of the parameters of the play of the game employing a set of mechanical reels are not randomly determined (e.g., the quantity of paylines to be activated), the selection of the paytable accounts for both random events and non-random events. As such, the gaming system selects different paytables for the play of the game employing a set of mechanical reels to make different weighted selections for the play of the game employing a set of mechanical reels to account for different randomly occurring events which influence the play of the game employing a set of mechanical reels and for different non-randomly occurring events each of which influence the play of the game employing a set of mechanical reels.

In certain embodiments, the gaming system provides one or more indications to the player regarding which paytable is being employed. In one such embodiment, the gaming system displays information to the player regarding which paytable is being employed. In another such embodiment, the gaming system modifies one or more aspects of the mechanical reels, such as modifies one or more lighting aspects of the mechanical reels and/or modifies how fast or slow the mechanical reels spin, to indicate to the player which paytable is being employed. In certain embodiments, the gaming system does not provide any indication to the player regarding which paytable is being employed.

In certain embodiments, zero, one or more of the parameters to employ for the triggered game employing a set of mechanical reels are determined in association with the occurrence of the game triggering event. In such embodiments, the gaming system utilizes a plurality of different game triggering events wherein the different game triggering events are associated with different parameters to employ for the triggered game employing a set of mechanical reels. In certain embodiments, zero, one or more of the parameters to employ for the triggered game employing a set of mechanical reels are additionally or alternatively determined independent of the occurrence of the game triggering event.

In certain embodiments, following the occurrence of the game triggering event, the gaming system independently determines zero, one or more parameters to employ for the triggered game employing a set of mechanical reels. In certain other embodiments, following the occurrence of the game triggering event, the gaming system determines zero, one or more parameters to employ for the triggered game employing a set of mechanical reels based on one or more attributes or aspects of the player's gaming experience, such as a wagering history at the EGM and/or a player tracking status of an identified player.

In various embodiments, following the selection of one or more parameters for the play of the game and prior to stopping a spinning of the plurality of mechanical reels (not shown), the gaming system utilizes the determined parameters to randomly determine an outcome for the play of the triggered game as indicated in block 108 of FIG. 1. In these embodiments, since the mechanical reels include static symbols having static relationships to one another, the gaming system determines a position or orientation of each of the mechanical reels such that an outcome for the play of the triggered game is displayed in association with the activated paylines and one or more symbols displayed at one or more reel display positions of the mechanical reels (wherein, as described below, such symbols are viewable through the symbol display positions of the display device). Put differently, since the symbols displayed by each mechanical reel are spatially related to one another such that a random generation of one symbol associated with a designated orientation of a mechanical reel is associated with the automatic generation of other symbols of the mechanical reel in corresponding orientations, the randomly determined outcome is associated with the random determination of which symbols of the mechanical reels are displayed through the symbol display positions of the video transmissive display device and which symbols of the mechanical reel are not displayed through the symbol display positions of the video transmissive display device.

Following the determination of an outcome for the play of the triggered game, as indicated in block 110 of FIG. 1, the gaming system stops the spinning of the mechanical reels (not shown) and displays the determined outcome such that the symbols of the mechanical reels which form the determined outcome are viewable through the symbol display positions of a display device. For example, as seen in each of FIGS. 3A to 3C, following the spinning of the mechanical reels (not shown), the gaming system stops the mechanical reels 202*a* to 202*c* to display the same symbols of the same mechanical reels viewable through the same portion of the video transmissive display device.

After causing the mechanical reels to stop spinning to display the outcome randomly determined in association with the paytable selected for the specific parameters of the particular play of the game employing the set of mechanical reels, the gaming system proceeds to determine and display any awards associated with the determined outcome as indicated in blocks 112 and 114. For example, as seen in FIG. 3A, following the stopping of the mechanical reels 202*a* to 202*c* to display no winning symbol combination along the single wagered on payline 210*a* (which display device 204 displays superimposed over the mechanical reels 202*a* to 202*c*), the gaming system determines that based on the paytable employed for the game illustrated in FIG. 3A, the symbol combination displayed along this payline is not associated with any award. In another example, as seen in FIG. 3B, following the stopping of the mechanical reels 202*a* to 202*c* to display a seven symbol—seven symbol—seven symbol winning combination formed along payline 4 210*d* (which display device 204 displays superimposed over the mechanical reels 202*a* to 202*c*), the gaming system determines that based on the paytable employed for the game illustrated in FIG. 3B, the winning symbol combination is associated with an award of 1200 credits. In another example, as seen in FIG. 3C, following the stopping of the mechanical reels 202*a* to 202*c* to display a seven symbol—seven symbol—seven symbol winning combination formed along payline 4 210*d* (which display device 204 displays superimposed over the mechanical reels 202*a* to 202*c*), the gaming system determines that based on the paytable employed for the game illustrated in FIG. 3C, the winning symbol combination is associated with an award of 1320 credits. It should be appreciated that as illustrated in these examples, the same symbols randomly determined in association with the same mechanical reels result in different awards based on one or more factors contributed by the video transmissive display device (e.g., which paylines displayed by the video transmissive display device are evaluated and which paylines displayable by the video transmissive display device are not evaluated).

Following the providing of the award and the corresponding conclusion of the play of the game employing the set of mechanical reels, the gaming system returns to block 102 and await another selection of another game to play.

In certain embodiments, in addition to employing the display device to superimpose certain images over the mechanical reels, such as the paylines superimposed over the mechanical reels of FIG. 3A to 3C (wherein different quantities of paylines are associated with different games played and different paytables employed), the display device superimposes certain images over the mechanical reels that alter one or more attributes of one or more symbols displayed by the mechanical reels. For example, as seen in FIGS. 3A to 3C, one or more mechanical reels include a reel display position where a generic seven symbol is displayed and the gaming system utilizes the video transmissive display device to superimpose one or more images over that generic seven symbol to alter the functionality of that generic seven symbol (e.g., changing that generic seven symbol to 2× or double seven symbol). In another example, one or more mechanical reels include a reel display position where a generic non-colored symbol is displayed and the gaming system utilizes the video transmissive display device to superimpose one or more colors over that generic symbol to alter the functionality of that generic symbol. It should be appreciated that the use of the video transmissive display device to modify one or more attributes of one or more symbols displayed by one or more mechanical reels may result in an activation of a feature for the currently played game (and/or one or more subsequently played games), wherein such an activated feature results in the modification of one or more components, aspects, or elements of one or more plays of a game, such as the modification of one or more game outcomes of one or more plays of a game (e.g., the symbols evaluated for the play(s) of the game) and/or the modification of any award determined for one or more plays of the game. In different embodiments, such features include, but are not limited to: a feature which superimposed one or more symbols over the randomly generated symbols of the mechanical reels; a feature which superimposes one or more symbols of the randomly generated symbols of the mechanical reels with a predetermined symbol pattern; a feature which superimposes one or more symbols of the randomly generated symbols of the mechanical reels with a predetermined pattern of wild symbols; a superimposed modifier, such as a superimposed multiplier, feature; a superimposed book-end wild symbols feature; a superimposed stacked wild symbols feature; a superimposed expanding wild symbols feature; a superimposed nudging wild symbols feature; a superimposed retrigger symbol feature; a superimposed anti-terminator symbol feature; a superimposed locking reel feature; a superimposed expanding reel feature; a superimposed locking reel display position feature; a feature modifying a placed wager amount; a feature modifying a placed side wager amount; a superimposed feature modifying a number of wagered on paylines; a superimposed feature modifying a wager placed on one or more paylines (or on one or more designated paylines); a superimposed feature modifying a number of ways to win wagered on; a superimposed feature modifying a wager placed on one or more ways to win (or on one or more designated ways to win); a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a superimposed feature modifying one or more modifiers, such as multipliers, available; a superimposed feature modifying an activation of a reel (or a designated reel); a superimposed feature modifying an activation of a plurality of mechanical reels; a superimposed feature modifying a generated outcome (or a designated generated outcome); a superimposed feature modifying a generated outcome (or a designated generated outcome) associated with an award over a designated value; a superimposed feature modifying a generated outcome (or a designated generated outcome) on a designated payline; a superimposed feature modifying a generated outcome (or a designated generated outcome) in a scatter configuration; a superimposed feature modifying a winning way to win (or a designated winning way to win); a superimposed feature modifying a designated symbol or symbol combination; a superimposed feature modifying a generation of a designated symbol or symbol combination on a designated payline; a superimposed feature modifying a generation of a designated symbol or symbol combination in a scatter configuration; and/or a feature modifying any game play feature associated with any play of any game of the present disclosure.

In certain embodiments, the gaming system employs one set of mechanical reels, wherein one of a plurality of paytables is selected based on the parameters of the use of that set of mechanical reels. In certain embodiments, the gaming system employs a plurality of sets of mechanical reels which are each associated with a plurality of paytables, wherein for each of the sets of mechanical reels, one of the plurality of paytables associated with that set of mechanical reels is selected based on the parameters of the use of that set of mechanical reels. In certain embodiments, the gaming system employs a plurality of sets of mechanical reels which are collectively associated with a plurality of paytables, wherein one of the plurality of paytables is selected based on the parameters of the use of those sets of mechanical reels.

It should be appreciated that while the game employing a set of mechanical reels described herein in the examples of FIGS. 3A to 3C is illustrated as displaying symbols which individually or collectively form symbol combinations associated with monetary awards, in different embodiments, one or more awards provided in association with the plays of the games include one or more of: a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

It should be appreciated that while the games illustrated in the examples of FIGS. 3A to 3C includes a set of mechanical reels, any suitable mechanical device which is aligned with a video transmissive display device and operable to display one or more symbols may be implemented in accordance with the plays of the games of the present disclosure In different embodiments, such different mechanical devices include, but are not limited to: one or more mechanical wheels, one or more mechanical die, one or more mechanical roulette wheels with one or more balls, one or more pinball-style mechanical devices, and/or one or more pachinko-style mechanical devices.

In different embodiments, as described above, a game triggering event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the gaming system does not provide any apparent reasons to the players for an occurrence of a game triggering event. In these embodiments, such determinations are not triggered by an event in a primary game or based specifically on any of the plays of any primary games. That is, these events occur without any explanation or alternatively with simple explanations.

In one such embodiment, a game triggering event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a game triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a game triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a game triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a game triggering event occurs based on a predefined variable reaching a defined parameter threshold. For example, when the 500,000$^{th}$ player has played an EGM (ascertained from a player tracking system), one or more of such events or conditions occur. In different embodiments, the predefined parameter thresholds include a length of time, a length of time after a certain dollar amount is hit, a wager level threshold for a specific device (which EGM is the first to contribute $250,000), a number of EGMs active, or any other parameter that defines a suitable threshold.

In different embodiments, a game triggering event occurs based on a quantity of games played. In this embodiment, a quantity of games played is set for when one or more of such events or conditions will occur. In one embodiment, such a set quantity of games played is based on historic data.

In different embodiments, a game triggering event occurs based on time. In this embodiment, a time is set for when one or more of such events or conditions will occur. In one embodiment, such a set time is based on historic data.

In different embodiments, a game triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM and/or logs into the player tracking system using a mobile device, such as a personal gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a game triggering event occurs based on a system determination, including one or more random selections by the central controller. For example, as described above, the gaming system tracks all active EGMs and the wagers they placed, wherein based on the EGM's state as well as one or more wager pools associated with the EGM, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a game triggering event occurs based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits bet by the player in that primary game. At the end of the primary game, the randomly selected number is compared with the numbers allocated to the player and if a match occurs, one or more of such events or conditions occur.

It should be appreciated that any suitable manner of causing a game triggering event to occur may be implemented in accordance with the gaming system and method of the present disclosure. It should be further appreciated that one or more of the above-described triggers pertaining to a game triggering event occurring may be combined in one or more different embodiments.

Alternative Embodiments

It should be appreciated that in different embodiments, one or more of:

i. when a game triggering event occurs;
ii. a quantity of mechanical reels to employ in association with a play of a game;
iii. a quantity of a paylines to employ in association with a play of a game;
iv. which paytable to employ in association with a play of a game;
v. which awards and/or game features to associate with which symbols of the mechanical reels;
vi. a quantity of activations of the mechanical reels to employ for the play of the game; and/or
vii. any determination of the present disclosure;

is/are predetermined, randomly determined, randomly determined based on one or more weighted percentages, determined based on a generated symbol or symbol combination, determined independent of a generated symbol or symbol combination, determined based on a random determination by a server, determined independent of a random determination by a server, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

Gaming Systems

The above-described embodiments of the present disclosure may be implemented in accordance with or in conjunction with one or more of a variety of different types of gaming systems, such as, but not limited to, those described below. That is, the present disclosure contemplates a variety of different gaming systems each having one or more of a plurality of different features, attributes, or characteristics. A "gaming system" as used herein refers to various configurations of: (a) one or more servers; and/or (b) one or more electronic gaming machines such as those located on a casino floor. Thus, in various embodiments, the gaming system of the present disclosure includes: one or more electronic gaming machines in combination with one or more servers; one or more personal gaming devices in combination with one or more electronic gaming machines; one or more personal gaming devices, one or more electronic gaming machines, and one or more servers in combination with one another; a single electronic gaming machine; a plurality of electronic gaming machines in combination with one another; a single server; and/or a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM in combination with a server. In such embodiments, the EGM is configured to communicate with the server through a data network or remote communication link. In certain such embodiments, the EGM is configured to communicate with another EGM through the same data network or remote communication link or through a different data network or remote communication link. For example, the gaming system includes a plurality of EGMs that are each configured to communicate with a server through a data network.

In certain embodiments in which the gaming system includes an EGM in combination with a server, the server is any suitable computing device (such as a server) that includes at least one processor and at least one memory device or data storage device. As further described herein, the EGM includes at least one EGM processor configured to transmit and receive data or signals representing events, messages, commands, or any other suitable information between the EGM and the server. The at least one processor of that EGM is configured to execute the events, messages, or commands represented by such data or signals in conjunction with the operation of the EGM. Moreover, the at least one processor of the server is configured to transmit and receive data or signals representing events, messages, commands, or any other suitable information between the server and the EGM. The at least one processor of the server is configured to execute the events, messages, or commands represented by such data or signals in conjunction with the operation of the server. One, more than one, or each of the functions of the server may be performed by the at least one processor of the EGM. Further, one, more than one, or each of the functions of the at least one processor of the EGM may be performed by the at least one processor of the server.

In certain such embodiments, computerized instructions for controlling any games (such as any primary or base games and/or any secondary or bonus games) displayed by the EGM are executed by the server. In such "thin client" embodiments, the server remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the server to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a server, computerized instructions for controlling any primary or base games displayed by the EGM are communicated from the server to the EGM in a thick client configuration, and computerized instructions for controlling any secondary or bonus games or other functions displayed by the EGM are executed by the server in a thin client configuration.

In certain embodiments in which the gaming system includes: (a) an EGM configured to communicate with a server through a data network; and/or (b) a plurality of EGMs configured to communicate with one another through a data network, the data network is a local area network (LAN) in which the EGMs are located substantially proximate to one another and/or the server. In one example, the EGMs and the server are located in a gaming establishment or a portion of a gaming establishment.

In other embodiments in which the gaming system includes: (a) an EGM configured to communicate with a server through a data network; and/or (b) a plurality of EGMs configured to communicate with one another through a data network, the data network is a wide area network (WAN) in which one or more of the EGMs are not necessarily located substantially proximate to another one of the EGMs and/or the server. For example, one or more of the EGMs are located: (a) in an area of a gaming establishment different from an area of the gaming establishment in which the server is located; or (b) in a gaming establishment different from the gaming establishment in which the server is located. In another example, the server is not located within a gaming establishment in which the EGMs are located. In certain embodiments in which the data network is a WAN, the gaming system includes a server and an EGM each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a server through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the server identifies a player before enabling that player to place any wagers on any plays of any wagering games. In one example, the server identifies the player by requiring a player account of the player to be logged into via an input of a unique username and password combination assigned to the player. The server may however, identify the player in any other suitable manner, such as by validating a player tracking identification number associated with the player; by reading a player tracking card or other smart card inserted into a card reader (as described below); by validating a unique player identification number associated with the player by the server; or by identifying the EGM, such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM.

The server and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 4:
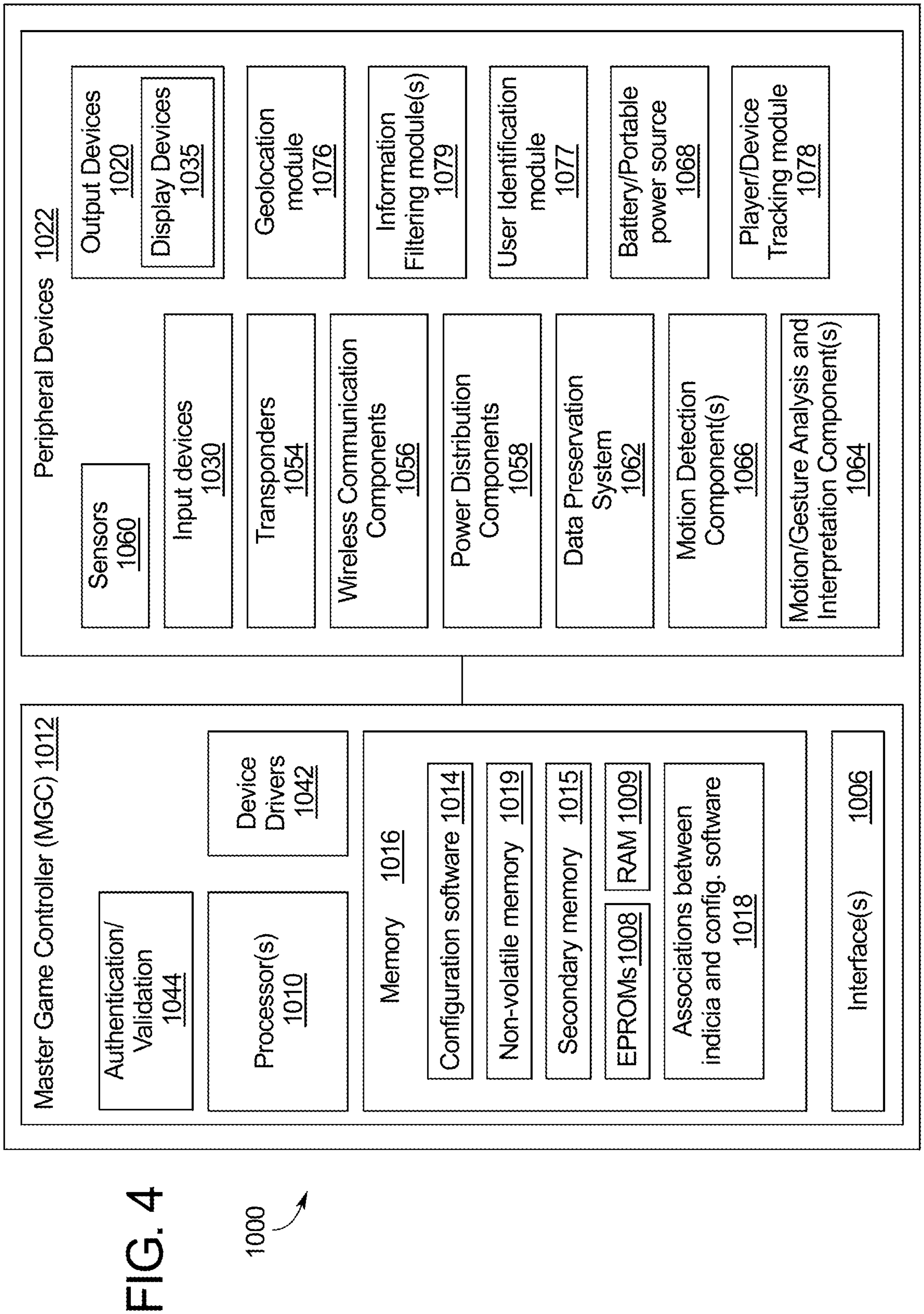
FIG. 4 is a schematic block diagram of one embodiment of an electronic configuration of an example gaming system of the present disclosure.
Figure 5A:
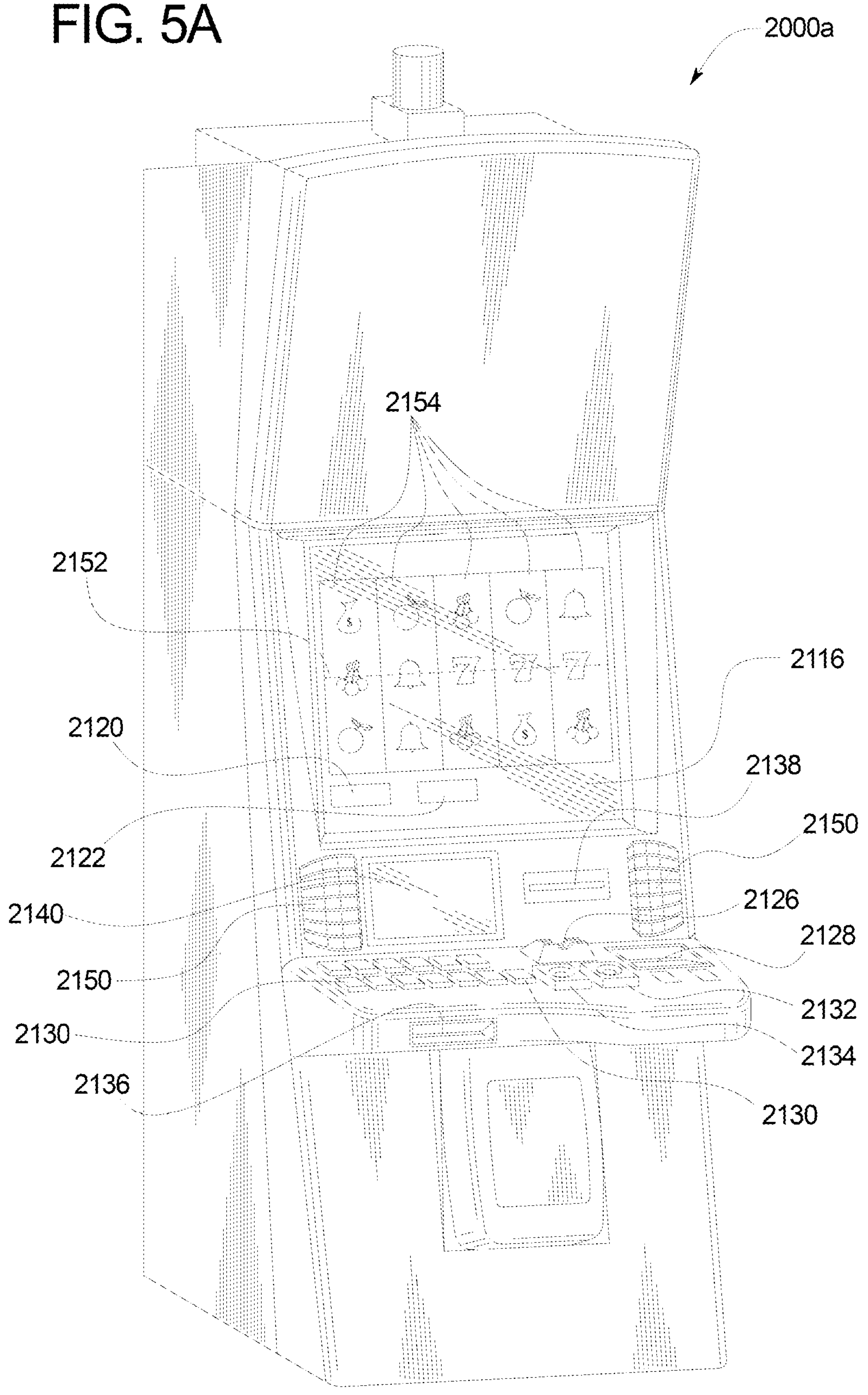
FIGS. 5A and 5B are perspective views of example alternative embodiments of the gaming system of the present disclosure.
Figure 5B:
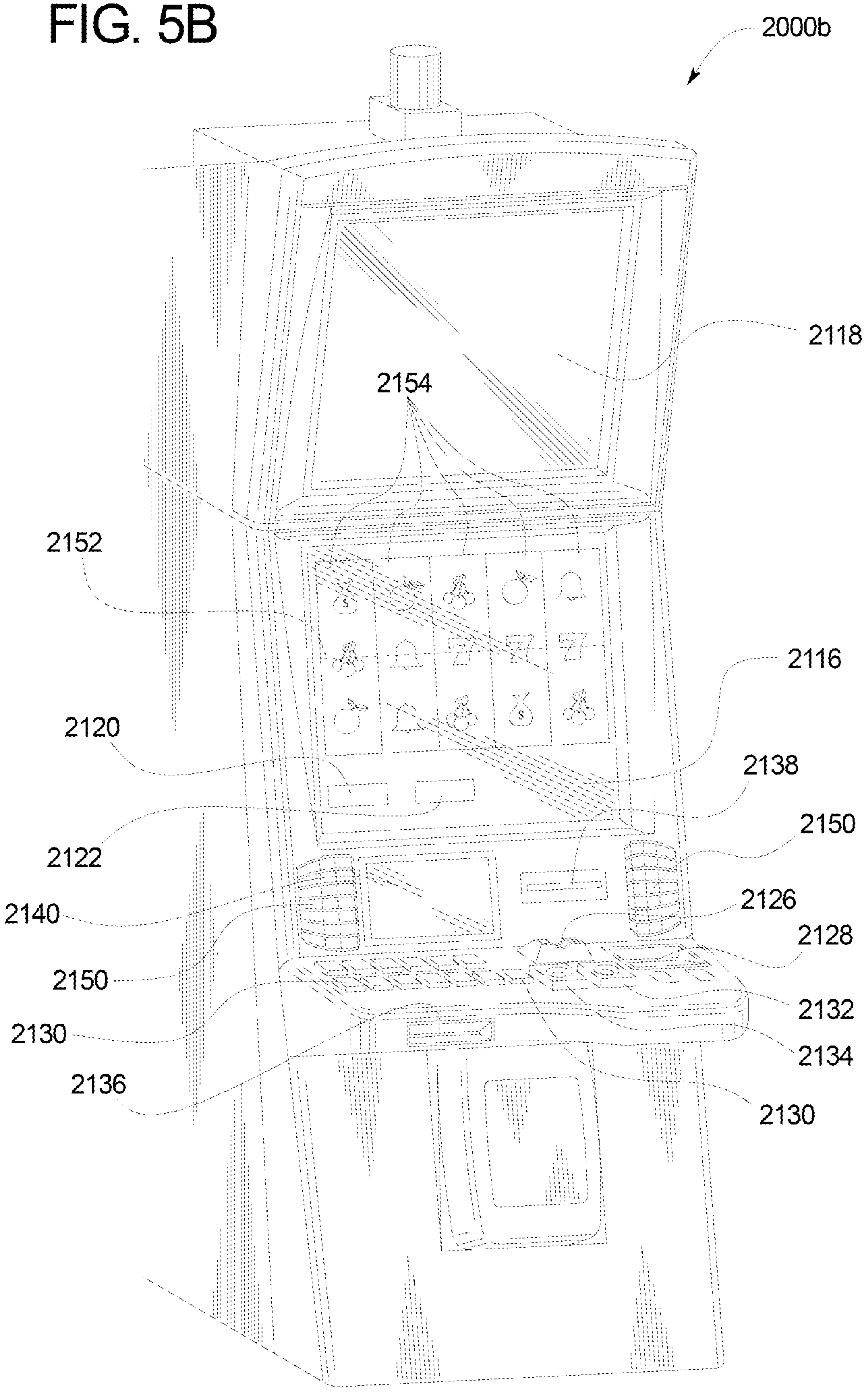

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 (including zero, one or more display devices) configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116 (that displays a payline 2152 and through which a plurality of mechanical reels 2154 are viewable), a player tracking display 2140, a credit display 2120, and a bet display 2122. The example EGM 2000*b* illustrated in FIG. 5B includes a central display device 2116 (that displays a payline 2152 and through which a plurality of mechanical reels 2154 are viewable), an upper display device 2118, a player tracking display 2140, a credit display 2120, and a bet display 2122.

In various embodiments, one or more of the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 maybe used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 maybe operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM.

For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A method of operating an electronic gaming machine, the method comprising:

responsive to a play of a first game associated with a first quantity of activated paylines displayed by a video transmissive display device supported by a housing of the electronic gaming machine and comprising a controllable transparent portion arranged relative to a plurality of mechanical reels supported by the housing of the electronic gaming machine such that a common line of sight passes through a portion of the video transmissive display device to a portion of each of the mechanical reels:

selecting, by a processor and based on the first quantity of activated paylines, a first paytable, for each of the mechanical reels, randomly determining, by the processor and based on the selected first paytable, a symbol of a plurality of symbols displayed at a plurality of reel display positions of that mechanical reel, and when an opening of an access door of the electronic gaming machine is detected via a security monitoring circuit of the electronic gaming machine:

disabling, by the processor, any movement of any of the mechanical reels, storing data associated with a display state of the video transmissive display device, and following at least a closing of the access door of the electronic gaming machine detected via the security monitoring circuit of the electronic gaming machine:

loading, by the processor, the stored data to reconstitute the display state of the video transmissive display device, enabling, by the processor, movement of the mechanical reels, and for each of the mechanical reels, causing, by the processor, that mechanical reel to move such that the reel display position associated with the randomly determined symbol of the symbols of that mechanical reel is viewable through the controllable transparent portion of the video transmissive display device, and responsive to a play of a second game associated with a second, different quantity of activated paylines displayed by the video transmissive display device:

selecting, by the processor and based on the second, different quantity of activated paylines, a second, different paytable, for each of the mechanical reels, randomly determining, by the processor and based on the selected second, different paytable, a symbol of the symbols of that mechanical reel, wherein for at least one of the mechanical reels, a symbol of the symbols of that mechanical reel is available to be randomly determined based on the selected second, different paytable and that symbol of that mechanical reel is unavailable to be randomly determined based on the selected first paytable, and for each of the mechanical reels, causing, by the processor, that mechanical reel to move such that the reel display position associated with the randomly determined symbol of the symbols of that mechanical reel is viewable through the controllable transparent portion of the video transmissive display device.

2. The method of claim 1, wherein a probability of at least one of the symbols of at least one of the mechanical reels being randomly determined in association with the first paytable is different than a probability of that at least one symbol being randomly determined in association with the second, different paytable.

3. The method of claim 1, wherein a first symbol combination displayed along a first activated payline is associated with a first award in association with the first paytable and the first symbol combination displayed along the first activated payline is associated with a second, different award in association with the second, different paytable.

4. The method of claim 1, further comprising causing the controllable transparent portion of the video transmissive display device to display at least part of each activated payline.

5. The method of claim 1, wherein the first quantity of activated paylines comprises a first quantity of wagered on paylines.

6. The method of claim 1, further comprising, responsive to an occurrence of a symbol modification event, causing the controllable transparent portion of the video transmissive display device to display a modification of at least one of the symbols of at least one of the mechanical reels.

7. The method of claim 6, wherein the modification occurs in association with a spinning of the mechanical reels.

8. The method of claim 1, further comprising, responsive to the play of the second game associated with the second, different quantity of activated paylines displayed by the video transmissive display device following the play of the first game associated with the first quantity of activated paylines displayed by the video transmissive display device, causing the video transmissive display device to display the second, different paytable replacing the first paytable.

9. The method of claim 1, wherein the play of the first game is associated with a first bonus game at least partially displayed by the video transmissive display device and the play of the second game is associated with a second, different bonus game at least partially displayed by the video transmissive display device.

10. A method of operating an electronic gaming machine, the method comprising:

receiving an input, via an input device, of a quantity of paylines for a play of a game, for each of the quantity of paylines for the play of the game:

activating, by a processor, that payline, and causing a video transmissive display device supported by a housing of the electronic gaming machine to display that payline, wherein the video transmissive display device comprises a controllable transparent portion arranged relative to a plurality of mechanical reels supported by the housing of the electronic gaming machine such that a common line of sight passes through a portion of the video transmissive display device to a portion of the mechanical reels, and the controllable transparent portion of the video transmissive display device displays at least part of each activated payline, determining, by the processor and based on the activated paylines, a paytable for the play of the game, wherein different paytables are associated with different activated paylines, for each of the mechanical reels, randomly determining, by the processor and based on the determined paytable for the play of the game, a symbol of a plurality of symbols displayed at a plurality of reel display positions of that mechanical reel, wherein for at least one of the mechanical reels, a symbol of the symbols of that mechanical reels is available to be randomly determined based on the determined paytable for the play of the game, and that symbol of that mechanical reel is unavailable to be randomly determined based on a selection of a different paytable for the play of the game, when an opening of an access door of the electronic gaming machine is detected via a security monitoring circuit of the electronic gaming machine:

disabling, by the processor, any movement of any of the mechanical reels, storing data associated with a display state of the video transmissive display device, and following at least a closing of the access door of the electronic gaming machine detected via the security monitoring circuit of the electronic gaming machine:

loading, by the processor, the stored data to reconstitute the display state of the video transmissive display device, enabling, by the processor, movement of the mechanical reels, and for each of the mechanical reels, causing, by the processor, that mechanical reel to move such that the reel display position associated with the randomly determined symbol of the symbols of that mechanical reel is viewable through the controllable transparent portion of the video transmissive display device, and determining, by the processor and based on the activated paylines and the symbols of the mechanical reels viewable through the controllable transparent portion of the video transmissive display device, an award for the play of the game.

11. The method of claim 10, wherein different paytables are associated with different probabilities of the same symbol of the same mechanical reel being randomly determined.

12. A method of operating an electronic gaming machine, the method comprising:

responsive to a play of a first game associated with a first quantity of wagered on paylines displayed by a video transmissive display device supported by a housing of the electronic gaming machine and comprising a controllable transparent portion arranged relative to a plurality of mechanical reels supported by the housing of the electronic gaming machine such that a common line of sight passes through a portion of the video transmissive display device to a portion of the mechanical reels:

selecting, by a processor and based on the first quantity of wagered on paylines, a first paytable, for each of a first quantity of the mechanical reels associated with the play of the first game, randomly determining, by the processor and based on the selected first paytable, a symbol of a plurality of symbols displayed at a plurality of reel display positions of that mechanical reel, and when an opening of an access door of the electronic gaming machine is detected via a security monitoring circuit of the electronic gaming machine:

disabling, by the processor, any movement of any of the plurality of mechanical reels, storing data associated with a display state of the video transmissive display device, and following at least a closing of the access door of the electronic gaming machine detected via the security monitoring circuit of the electronic gaming machine:

loading, by the processor, the stored data to reconstitute the display state of the video transmissive display device, enabling, by the processor, movement of the plurality of mechanical reels, and for each of the first quantity of mechanical reels, causing, by the processor, that mechanical reel to move such that the reel display position associated with the randomly determined symbol of the symbols of that mechanical reel is viewable through the controllable transparent portion of the video transmissive display device, and responsive to a play of a second game associated with a second, different quantity of wagered on paylines displayed by the video transmissive display device:

selecting, by the processor and based on the second, different quantity of wagered on paylines, a second, different paytable, for each of a second, different quantity of the mechanical reels associated with the play of the second game, randomly determining, by the processor and based on the selected second, different paytable, a symbol of the symbols of that mechanical reel, wherein for at least one of the second, different quantity of the mechanical reels, a symbol of the symbols of that mechanical reel is available to be randomly determined based on the selected second, different paytable and that symbol of that mechanical reel is unavailable to be randomly determined based on the selected first paytable, and for each of the second, different quantity of the mechanical reels, causing, by the processor, that mechanical reel to move such that the reel display position associated with the randomly determined symbol of the symbols of that mechanical reel is viewable through the controllable transparent portion of the video transmissive display device.

13. The method of claim 12, wherein a probability of at least one of the symbols of at least one of the mechanical reels being randomly determined in association with the first paytable is different than a probability of that at least one symbol being randomly determined in association with the second, different paytable.

14. The method of claim 12, wherein a first symbol combination displayed along a first wagered on payline is associated with a first award in association with the first paytable and the first symbol combination displayed along the first wagered on payline is associated with a second, different award in association with the second, different paytable.

15. The method of claim 12, further comprising causing the controllable transparent portion of the video transmissive display device to display at least part of each wagered on payline.

16. The method of claim 12, wherein the first quantity of the mechanical reels is based on a first total wager amount placed and the second, different quantity of the mechanical reels is based on the second, different total wager amount placed.

17. The method of claim 12, further comprising, responsive to an occurrence of a symbol modification event, causing the controllable transparent portion of the video transmissive display device to display a modification of at least one of the symbols of at least one of the mechanical reels.

18. The method of claim 17, wherein the modification occurs in association with a spinning of at least one of the mechanical reels.

19. The method of claim 12, further comprising, responsive to the play of the second game associated with the second, different quantity of wagered on paylines displayed by the video transmissive display device following the play of the first game associated with the first quantity of wagered on paylines displayed by the video transmissive display device, causing the video transmissive display device to display the second, different paytable replacing the first paytable.

20. The method of claim 12, wherein the play of the first game is associated with a first bonus game at least partially displayed by the video transmissive display device and the play of the second game is associated with a second, different bonus game at least partially displayed by the video transmissive display device.

* * * * *